(12) United States Patent
Collett et al.

(10) Patent No.: US 8,788,385 B2
(45) Date of Patent: Jul. 22, 2014

(54) SYSTEM AND METHOD OF AUCTIONING A DEFAULTED LOAN

(75) Inventors: Wayne Curtis Collett, Los Angeles, CA (US); Norman Alan Zahler, Vancouver, WA (US)

(73) Assignee: Property Liquidators LLC, Irvine, CA (US)

( * ) Notice: Subject to any disclaimer, the term of this patent is extended or adjusted under 35 U.S.C. 154(b) by 196 days.

(21) Appl. No.: 13/550,434

(22) Filed: Jul. 16, 2012

(65) Prior Publication Data

US 2012/0284142 A1 Nov. 8, 2012

Related U.S. Application Data

(60) Division of application No. 12/463,784, filed on May 11, 2009, now Pat. No. 8,341,051, and a division of application No. 13/098,274, filed on Apr. 29, 2011, and a continuation-in-part of application No. 12/217,283, filed on Jul. 2, 2008.

(60) Provisional application No. 60/958,887, filed on Jul. 10, 2007.

(51) Int. Cl.
*G06Q 40/00* (2012.01)

(52) U.S. Cl.
USPC .......................................................... 705/35

(58) Field of Classification Search
CPC ........ G06Q 40/00; G06Q 20/22; G06Q 20/29
USPC ...................... 705/1–50; 709/1–28; 236/1–29
See application file for complete search history.

(56) References Cited

U.S. PATENT DOCUMENTS

| 5,966,699 | A | 10/1999 | Zandi |
|---|---|---|---|
| 7,069,234 | B1 | 6/2006 | Cornelius et al. |
| 7,127,406 | B2 | 10/2006 | Triola |
| 7,213,001 | B2 | 5/2007 | DeSane |
| 2003/0154398 | A1 | 8/2003 | Eaton et al. |
| 2005/0278204 | A1 | 12/2005 | Weinberg et al. |
| 2007/0192188 | A1 | 8/2007 | Gregerson |
| 2008/0086407 | A1 | 4/2008 | Singh |

OTHER PUBLICATIONS

Susilatwati, Connie and Lin, Vickey Chiu-Chin, Case Analyssis of Auction Market in Brisbane Housing System, QUT ePrints, web, 1-15.*

* cited by examiner

*Primary Examiner* — Marissa Liu
(74) *Attorney, Agent, or Firm* — Rutan & Tucker LLP; Hani Z. Sayed

(57) ABSTRACT

A method and system for conducting an online property auction whereby the system allows for identifying an owner of property willing to sell his property by an online auction, entering into a contract with the owner obligating him to complete the sales of his property conducted pursuant to terms of the contract; pre-arranging a minimum auction price for his property that accounts for the owner's interest, plus costs and fees, conducting the on-line auction with a plurality of bidders for his property whereby at the on-line auction's conclusion there is a winning bidder and ensuring the transfer of the winning bidder's funds to the escrow holder.

5 Claims, 4 Drawing Sheets

SYSTEM AND METHOD OF AUCTIONING A DEFAULTED LOAN

CROSS REFERENCE TO RELATED APPLICATIONS

This is a divisional application of U.S. patent application Ser. No. 12/463,784 filed on May 11, 2009, and U.S. patent application Ser. No.: 13/098,274 filed on Apr. 29, 2011 which both claim priority to continuation-in-part of a U.S. patent application Ser. No. 12/217,286 filed on Jul. 2, 2008 entitled "Method of Doing Business for Auctioning a Defaulted Loan" which claims priority to U.S. Provisional Patent Application filed Jul. 10, 2007 under Ser. No. 60/958,887.

BACKGROUND OF THE INVENTION

1. Field of the Invention

The present invention relates to a system and method of doing business for auctioning a defaulted loan. More specifically, the present invention relates to a system and method for assisting an owner of a promissory note in default and more particularly to a system and a method for assisting said note owner, including the steps of selling said defaulted note by means of an auction using an internet web portal as an auction site.

2. Description of the Prior Art

U.S. Pat. No. 7,213,001 teaches a method for restructuring a debt of a debtor who has an interest in a distressed property by a third party. The method includes the steps of comparing a present appraised value of the property to a total cost for purchasing the property from the debtor by the third party, satisfying the personal debt of debtor by the third party, and reselling the property back from the third party to the debtor based upon a present appraised value of the property. If the present appraised value of the property exceeds the total cost to the third party by a preselected value then the third party purchases the property from the debtor, satisfies the personal debt of the debtor, and resells the property back to the debtor at the present value of the property. The vast majority of homes purchased are purchased on the basis of loan instrument which includes a promissory note that specifies a principal amount borrowed from a lender and an interest rate, and is secured by a mortgage or deed of trust on the property. The promissory note establishes the borrower's obligation to make periodic payments to the lender and the mortgage or deed of trust establishes the lender's right to foreclose on the property in the event the borrower fails to make the scheduled payments.

When a person or entity borrows money from a lender, the borrower must sign a promissory note promising to repay the home loan and a mortgage note (or deed of trust) to serve as collateral for the loan. The bearer of such notes has a legal claim to the underlying property until the bearer is paid in full. To insure a continuous supply of available funds, the lender will often sell groups of notes (mortgage loans) to investors. This selling of mortgage loans to investors is referred to as the secondary mortgage market.

Under most circumstances, the borrower completes the loan obligation by making a lump sum payment before the end of the period to satisfy the loan. However, not all borrowers can consistently make loan payments. Often times an acute event or unforeseen financial circumstance may cause the borrower to stop making payments and default on the loan.

As a result of the borrower's default the lender may foreclose on the property. Foreclosure is a legal process by which the lender will ultimately obtain title in property and resell the property. From the borrower's perspective, foreclosure is traumatic both from a financial as well as emotional standpoint. From a financial standpoint, the borrower not only looses the equity which has been established in the property, but even after the property has been foreclosed continues to suffer in the sense that the borrower's credit has been irrevocably damaged. From the lender's perspective, foreclosure is also undesirable. The foreclosure process is costly and thus further increases the lender's interest in an already distressed property. In addition, unless the ultimate sale price of the home after foreclosure is at least equal to the original value of the home, the lender's return may be compromised.

Prior to foreclosure or subsequent thereto the borrower may file for bankruptcy. Ultimately, however, the result is the same in that the bank will foreclose on the property once the payment schedule has not been met. Accordingly, foreclosure and its resultant hardships discussed above are not avoided by the borrower filing for bankruptcy. Moreover, by filing for bankruptcy, the borrower's credit will likely be damaged to the point where obtaining any future loan will be extremely difficult, thereby preventing the homeowner from purchasing a future home.

From the lender's perspective, bankruptcy is also not a desirable alternative since bankruptcy is a complicated legal proceeding, associated legal fees and costs, and most importantly, a delay in the collection of the loan.

In view of the above, it is desirable to seek techniques that would ensure payment of the loan to the creditor without the need to rely upon either foreclosure and/or bankruptcy proceedings.

U.S. Pat. No. 5,966,699 teaches a computer system that conducts an electronic loan auction over a computer network such as the Internet. The computer system includes a computer connected to the Internet, which performs the following functions of receiving an electronic loan application form from a prospective borrower, providing such application to a loan authorizer's computer over the computer network for approval, receiving an electronic message from the loan authorizer's computer indicating whether or not such loan has been approved, entering the loan application into a database that is accessible to lenders via the computer network if the loan is approved and maintaining the loan application in the database for a predetermined period of time during which lenders may submit bid S and the borrower may accept a bid.

U.S. Pat. No. 7,127,406 teaches an apparatus and method implements manages and tracks on-line digital transactions via an escrow, including opening, servicing, real-time or near-real time status of the broker, a title company, lender, vendor, buyer and seller; and closing of an escrow via a medium such as the internet. Multiple access methods are employed. The present invention provides computerization and internet type process implementation for escrow processes including, but not limited to, digital transaction coordination, digital status coordinators, seamless escrow transactions, on-line digital signatures, video signature authentication, digital certificate authentication, signature authentication, satellite and other wireless transmission of escrow transactions, voice digital instruction, the merging of voice with digital data transactions, set-top/web-TV digital escrow transmission, global digital escrow networking, and the like. The system includes appropriate data, application, and servers along with supporting LAN or WAN-based application to perform escrow services. The method of doing business in realty uses on-line communications and includes the steps of providing an on-line escrow account for parties to a transaction; providing on-line transactional account management services with respect to the on-line escrow account for the parties; and providing secure access to the on-line escrow account limited to the parties and third parties using on-line identification authentication. The system includes the use of computerized devices and communication devices connected to the Internet which performs receiving instructions for the opening of an escrow; providing and sending digital instructions to all parties involved in the transaction; offering the availability of a continuous digital escrow transaction by coordinating and permitting access to the on-going status of an escrow in progress; on-line digital signature, voice, video fingerprint or retina scanning personal identification authentication; transfer of funds or other consideration; submission of loan documents; closing escrow, delivering clear title, and release of transaction funds; and the like as would be useful in an escrow transaction.

U.S. Pat. No. 7,069,234 teaches a method of initiating an agreement in an e-Commerce environment. Across the many 'exchange of value' sites, there are three prevalent selling models: seller-centric, buyer-centric, and auction. The seller-centric model is the most common. In its simplest form, a company typically provides information about their products and gives the customer the ability to place orders. More advanced implementations use electronic means for supporting the entire sales and support process including: marketing, product display, merchandising, customer needs assessment, order processing, and many other activities. In most seller-centric solutions, the infrastructure is created and maintained by the merchant. The customer needs nothing more than a browser and/or access to the site. In a buyer-centric solution, the main focus is on customer or buyer trying to fulfill a need for a product. In contrast to seller-centric sites which offer products, a buyer-centric site displays items the buyer would like to purchase—in effect trying to lure sellers. Many of the same capabilities as seller-centric sites are needed such as order management and payment capabilities. In this case, the customer joins or creates an infrastructure focused on fulfilling his needs. The infrastructure typically provides an environment between the trading partners which promotes browsing and comparing products, ordering products, fulfillment, payment, and any needed customer support services. A concentration should be placed on the ease of transactions and information flow. For this reason, sellers may customize their product line to the buyers' specific needs. In a buyer-centric case the buyer provides the bulk of the e-Commerce infrastructure. Additional integration and setup may or may not be required for each trading partner who wishes to participate. Implementations requiring sellers to specially configure or integrate their own systems in order to participate are usually only successful where the buyer has substantial market power in the relationship, as in GM or Ford in buying parts from their suppliers. In such cases, agreements must be made as to what information is to be shared, how to model the information, the standards for messaging and communication, and what technologies will be used. Besides the mechanical hurdle of integrating multiple systems and the somewhat immature state of the software products to date, convincing trading partners to adopt an Internet commerce approach can also be very difficult. If one is not a particularly big or powerful buyer, it can be difficult to attract potential sellers to come to one's site and spend the time necessary to learn about one's needs.

This requires sellers to engage in a very different activity than they have traditionally performed and many are not eager to change their way of doing business for a relatively small customer. This section of the market has been slower to emerge. As mentioned above, trading partner maintenance is a key issue. Companies at the end of the hub must buy into the hub's practices and vision. Future vision and direction are also important. As changes are implemented, all trading partners have to move together.

Getting buy-in from all partners has the potential to slow down the adoption of new technologies and process innovations which over time can lead to a lack luster of the lowest common denominator approach. Broker or auction type solutions are also emerging, albeit more slowly. Broker implementations do not typically sell their own goods, but rather provide an e-Commerce environment to facilitate bringing multiple buyers and sellers together. Both buyers and sellers can utilize the broker's site and infrastructure rather than developing and maintaining their own e-Commerce capabilities. In this case, a broker has set up the infrastructure needed to buy and sell goods. The infrastructure will be very similar to a seller-centric solution with the addition of components needed to register goods to be sold (or in a buyer-centric twist-register request for quote), price negotiation and bidding and reconciliation services. A Trading Network (TN) is an excellent business example of a broker site. Users of the TN can issue Request for Quote's (RFQ'S) on the trading network. The request could be for raw materials, components, or finished items. Suppliers are free to answer a request for a quote providing they meet some basic guidelines and requirements. The network provides a true win-win relationship. Since the network can be global, suppliers and purchaser may never have known about are free to participate. Another example on the consumer side is a sales website. Such a site offers a variety of computer, electronic and fitness goods as well as a general merchandise auction. Customers can browse items in order to view product information and their current bid prices. Interested buyers can place a bid online and see how their bid price compares with others. The auctions are time-based and follow a detailed bidding process. As customers are out bid, they are notified via e-mail and have the option to reply with a counter bid.

SUMMARY OF INVENTION

The present invention discloses a system and a method for conducting an online business transaction. More specifically, the present invention teaches a system and a method for conducting an online business transaction between a plurality of remote parties. The system and method includes identifying an owner of property that may be willing to sell his property by an online auction, whether because of default on a loan, or for other reasons. Thereby, when the system identifies an individual seller, the system may allow the individual that is remotely connected to a network by a computer system, to enter into a contract which may be centrally housed in a database either on the network or on a host computer. The contract with the owner will obligate that individual to complete the sale of his/her property pursuant to the terms of the contract. Additionally, the system may pre-arrange a minimum auction price for his property that accounts for the owner's interest, plus costs and fees. This information may also be inputted by either the lien holder, or the individual property seller. The information relating to the minimum pricing and other costs associated with the sale of the property may also be housed on a database on the network or host computer. The system may then allow for the conducting of an on-line auction with a plurality of bidders for the property whereby at the on-line auction's conclusion there is a winning bidder. A remote user connected to the network may then transfer funds from their remote location to an online escrow holder which may hold the funds until the contractual obligations have been met.

To this end, in an exemplary embodiment of the present invention, the system allows for identification of a plurality of owners of a plurality of properties each of which are willing to sell at least one of their respective properties by an online auction and entering into contracts with the owners obligating them to complete the sales of their property conducted pursuant to the terms of the contract.

In an exemplary embodiment, a system for auctioning a property, the system comprising: identifying property owners remotely connected to a computer network by utilizing a computer station whereby the property owners are willing to sell their property by an online auction; providing a database to compile information on properties and property owners; the database having at least contractual information whereby a property owner enters into contracts, the terms of which obligates them to complete sale of their respective properties; the database containing information relating to at least a pre-arranged minimum auction price for each property that accounts for the property owner's interest, attendant costs and fees; conducting the on-line auction hosted by a remote server with a plurality of bidders for each property, whereby at the conclusion of the auction there is a winning bidder; and ensuring transfer of funds from the winning bidder to the property owner.

In an exemplary embodiment, wherein said property is a secured promissory note and the secured promissory note is delivered to the winning bidder through a licensed escrow holder located on the network.

In an exemplary embodiment, wherein the database contains information relevant to the auction including the secured promissory notes and supporting documents.

In an exemplary embodiment, wherein the database requires authentication of information from potential bidders, including proof of sufficient resources to successfully consummate the auction.

In an exemplary embodiment, a method of auctioning a property, the method comprising the steps of: identifying property owners remotely connected to a computer network by utilizing a computer station whereby the property owners are willing to sell their property by an online auction; providing a database to compile information on properties and property owners; the database having at least contractual information, whereby a property owner enters into contracts and the terms of which obligates them to complete sale of their respective properties; the database further has relevant information relating to the property, including property information pricing and secured promissory note and related documents; limiting bidding to bidders who have proven sufficient resources to complete the transaction; conducting an auction for the secured promissory note whereby at the auction's conclusion there is a winning bidder; arranging for the delivery of the original secured promissory note, its security instrument (trust deed or mortgage), the documentation supporting the value of security of the secured promissory note (appraisal), and evidence of ownership (title insurance) to a licensed escrow holder, who at the conclusion of said auction will deliver evidence of ownership of the original secured promissory note and related documents to the winning bidder and the appropriate proceeds to said note owner; and ensuring the transfer of the winning bidder's purchase funds to the escrow holder.

In an exemplary embodiment, a method of doing business comprising the steps of: identifying property owners remotely connected to a computer network by utilizing a computer station whereby the property owners are willing to sell their property by an online auction; providing a database to compile information on properties and property owners; the database having at least contractual information whereby a property owner enters into contracts and which the terms obligates them to complete sale of their respective properties; said database having pre-determined information relating to a minimum auction price for their respective properties that accounts for interest of the respective owner's, transaction costs and fees; conducting a plurality of on-line auctions for a plurality of properties with a plurality of bidders for the owners' properties.

In an exemplary embodiment, a method of doing business wherein said property is a secured promissory note and wherein said method includes the step of arranging for the delivery of evidence of ownership of each secured promissory note to the respective winning bidder.

In an exemplary embodiment, a method also includes the step of placing on the auction portal relevant information about the secured promissory note and related documents.

In an exemplary embodiment, a method further includes the step of limiting bidding to bidders who have proven resources to complete the transaction.

In an exemplary embodiment, a method of doing business wherein the steps include holding and completing the auction for a defaulted secured promissory note immediately preceding the foreclosure, trustee, marshal, judicial or any other court ordered sale of the note's underlying security.

In yet another exemplary embodiment of the present invention, the system provides a database whereby the database may contain information and questionnaires to the owners and/or lien holders which may provide at least a pre-arranging minimum auction price for the property that accounts for the owner's interest, plus costs and fees.

Still another exemplary embodiment of the invention is to allow the system to host and conduct an online auction for the properties that have been identified and to solicit bids from a plurality of bidders for the auctioned property.

Yet another exemplary embodiment is to provide a system and method for auctioning a defaulted loan whereby the system allows the auctioned property to be secured by a promissory note and may provide a mechanism for arranging for the delivery of the secured promissory note to the appropriate promissory note holder.

In another exemplary embodiment, a system and method for auctioning a defaulted loan is provided wherein the system includes information which may be uploaded to the hosted database that supports the auction, relevant information about the secured promissory note and related documents.

Still another exemplary embodiment is to provide a system and method for auctioning a defaulted loan whereby the system may prohibit and/or limit bidding on the property to bidders and/or buyers which have proven resources to complete the transaction. This may be accomplished by requiring an individual bidder to authenticate and log into the system and upload information relating to financing into the database such that the system can authenticate an individual bidder's ability to complete the transaction.

Other aspects and many of the attendant advantages will be more readily appreciated as the same becomes better understood by reference to the following detailed description and considered in connection with the accompanying drawings in which like reference symbols designate like parts throughout the figures.

The features of the present invention which are believed to be novel, are set forth with particularity in the appended claims.

DETAILED DESCRIPTION OF THE INVENTION

Figure 1:
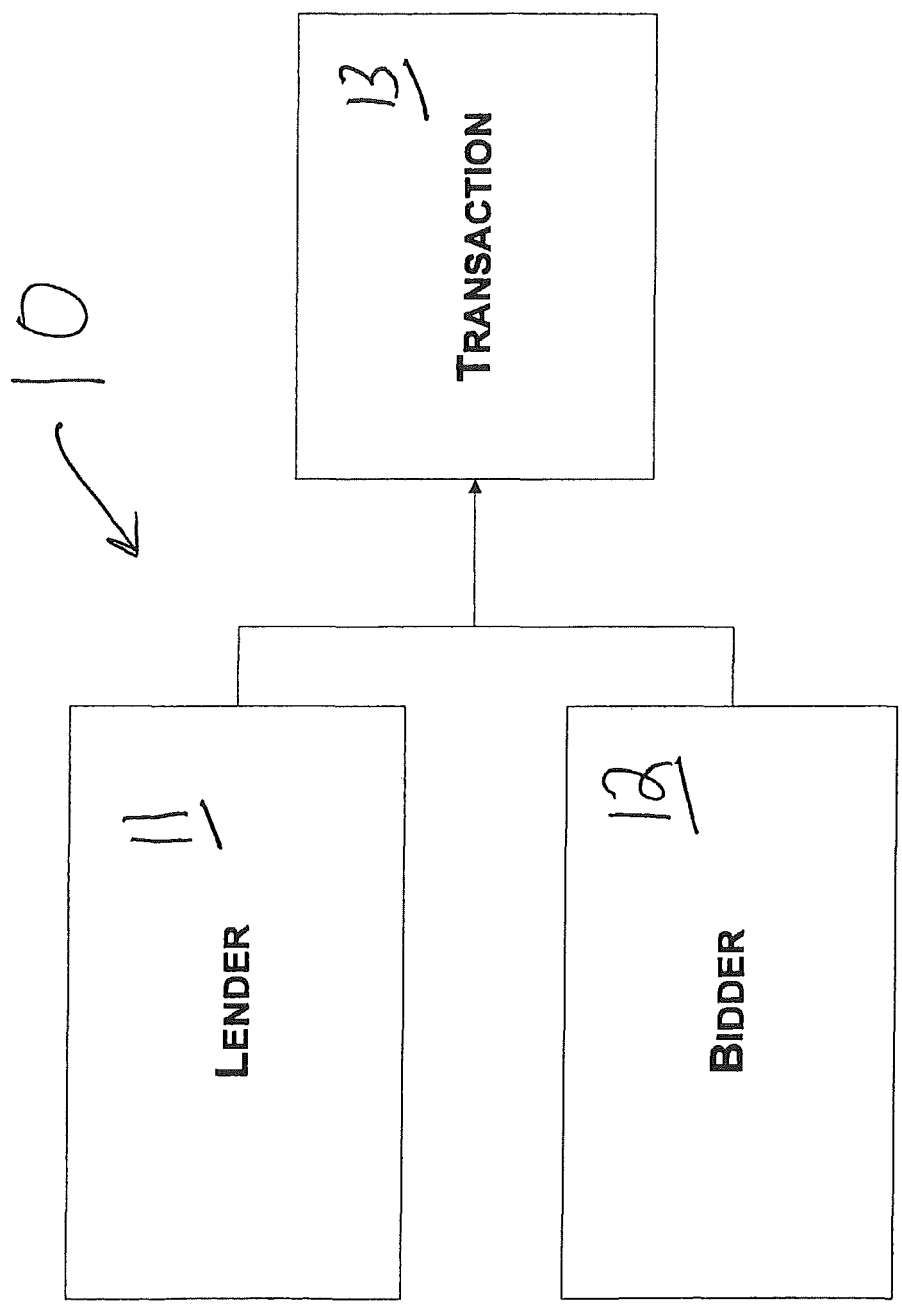
FIG. 1 is a block diagram of the three elements, Lender, Bidder and Transaction, respectively of an On-line Loan Auction Flowchart according to the first embodiment of the present invention.
Figure 2:
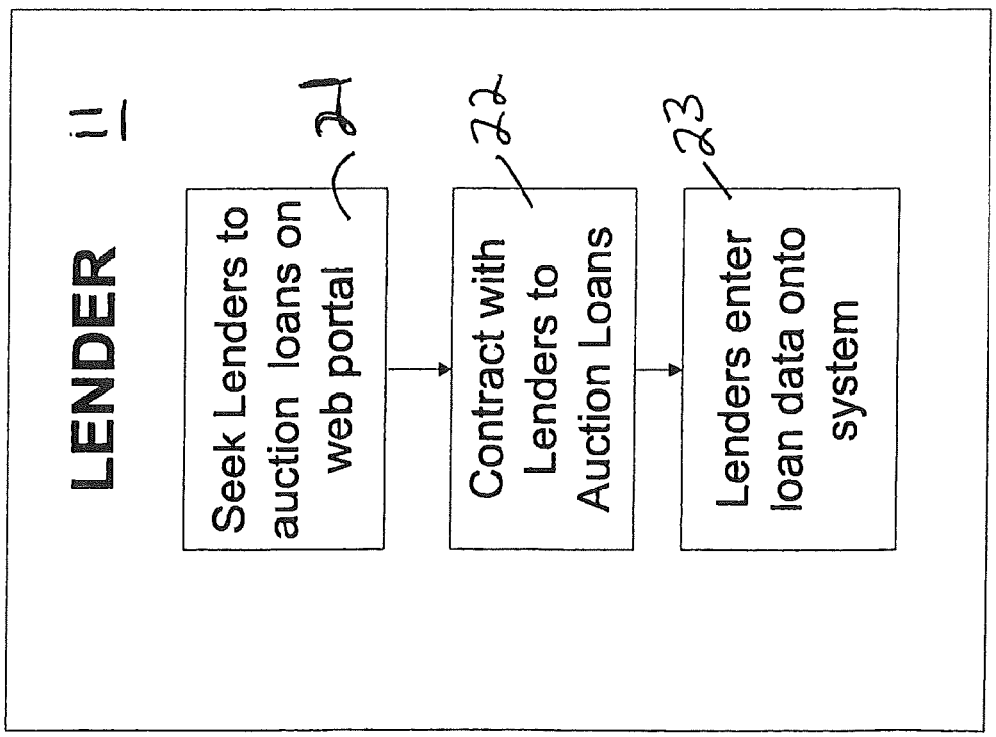
FIG. 2 is a block diagram of the Lender element of the On-line Loan Auction Flowchart of FIG. 1.

Referring to FIG. 1 the first embodiment of an On-line Loan Auction Flowchart 10 is shown as a block diagram. The block diagram consists of a Lender element 11, a Bidder element 12 and Transaction element 13. Referring to FIG. 2 in conjunction with FIG. 1 the Lender element 11 includes a first step 21 is to seek Lenders who are willing to auction loans on web portal, whereby the lender element 11 includes at least a remote computing station connected to a network. The second step 22 is to enter into a contract with lenders to auction loans and a third step 23 is to enable lenders to enter loan data into an on-line auction system having a database provided for this purpose. In the first steps 21 property owners who are willing to sell their property by an online auction are identified. In the second step 22 property owners enter into contracts. The terms of the contract obligates them to complete sale of their respective properties. The Lender element 11 may also includes the steps of pre-arranging a minimum auction price for each property that accounts for the property owner's interest, attendant costs and fees and conducting an on-line auction with a plurality of bidders for each property.

Figure 3:
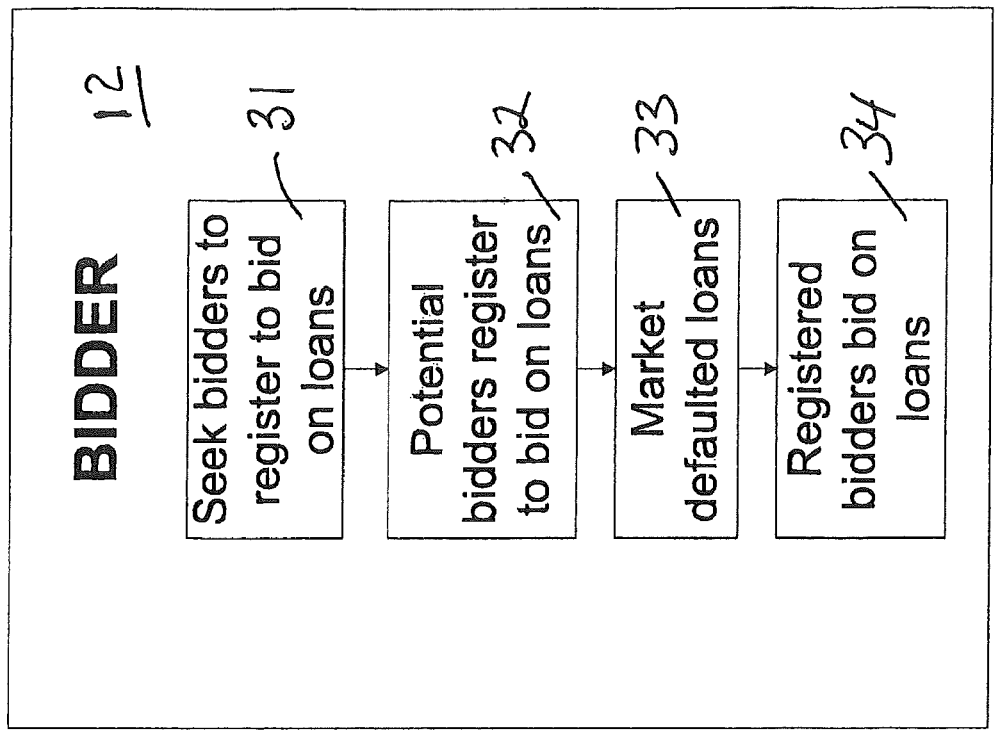
FIG. 3 is a block diagram of the Bidder element of On-line Loan Auction Flowchart of FIG. 1.

Referring to FIG. 3 in conjunction with FIG. 1 the Bidder element 12 includes a first step 31 of seeking bidders to register to bid on loans, a second step 32 of having potential bidders register to bid on loans, a third step 33 to market defaulted loans and a fourth step 34 to allow registered bidder to bid on loans.

Figure 4:
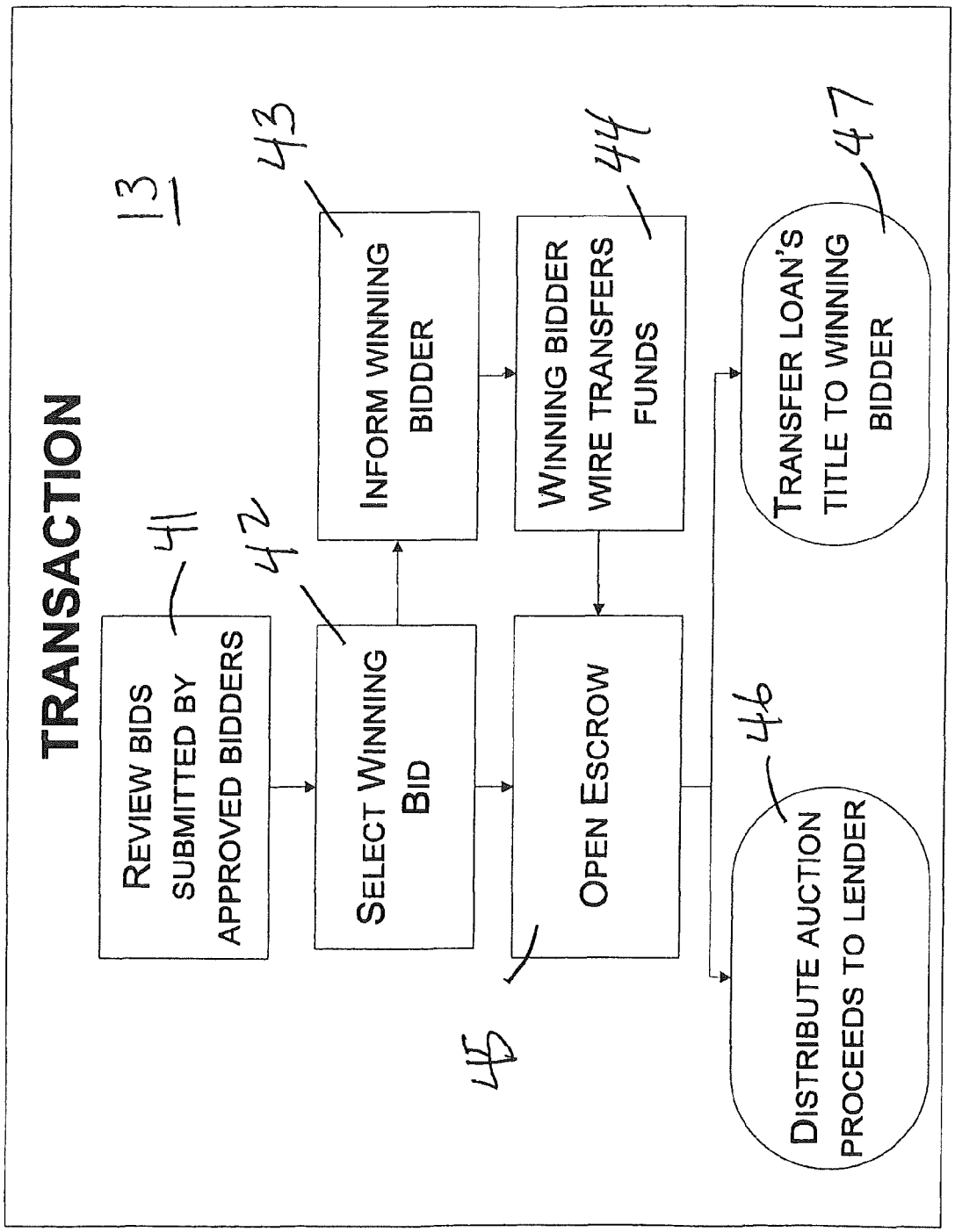
FIG. 4 is a block diagram of the Transaction element of the On-line Loan Auction Flowchart of FIG. 1.

Referring to FIG. 4 in conjunction with FIG. 1 the Transaction element 13 includes a first step 41 of reviewing bids submitted by approved bidders, a second step 42 of selecting winning bid, a third step 43 of informing winning bidder and a fourth step 44 of having winning bidder wire transfer funds to cover his winning bid. The Transaction element 13 also includes a fifth step 45 of opening escrow, a sixth step 46 of distributing auction proceeds to lender and a seventh step 47 of transferring loans title to winning bidder. At the conclusion of the auction there is a winning bidder. The method further includes the step of ensuring transfer of funds from the winning bidder to the property owner.

Figure 5:
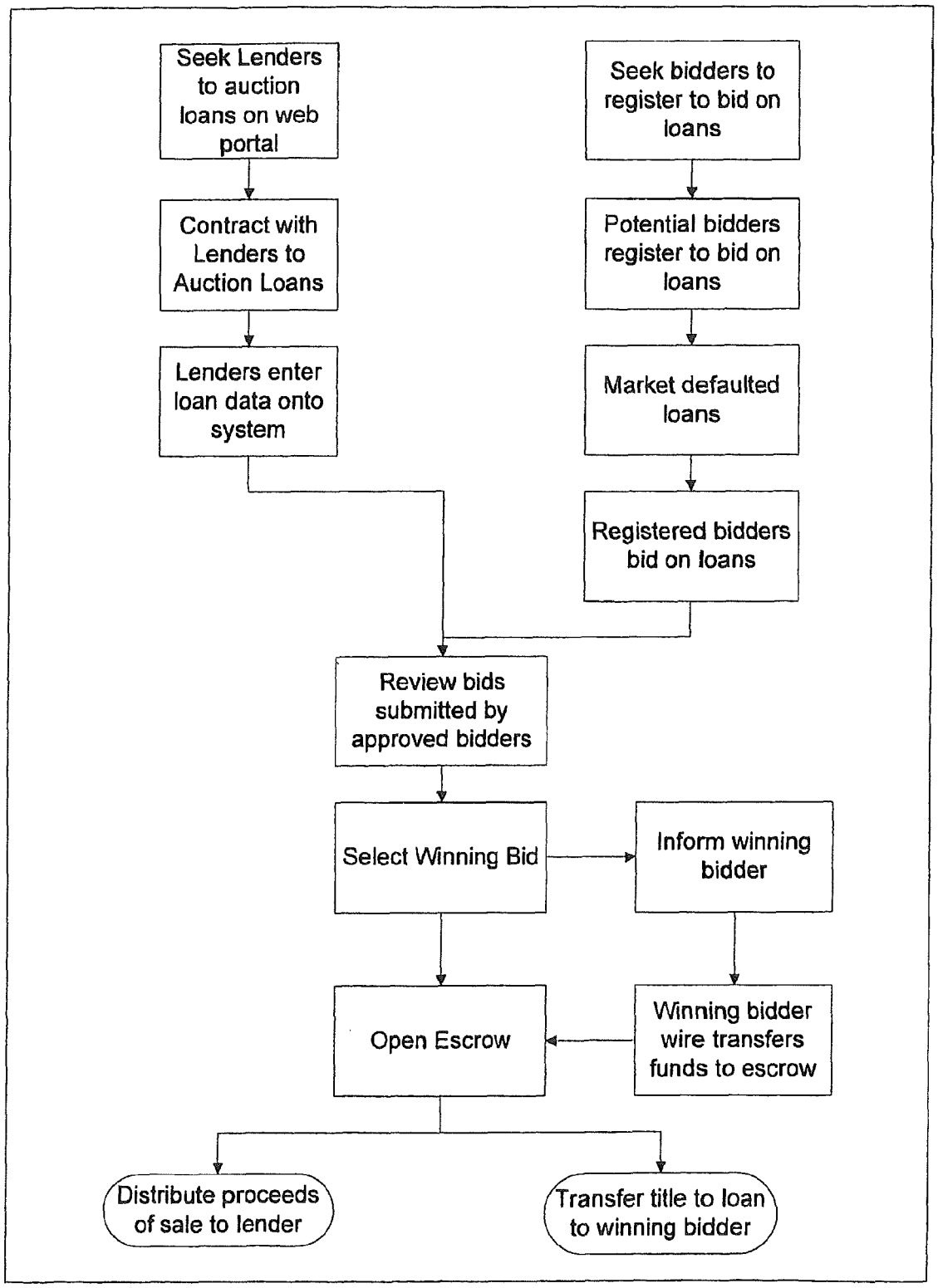
FIG. 5 is an On-line Loan Auction Flowchart of FIG. 1.

Referring to FIG. 5 in conjunction with FIG. 1, FIG. 2, FIG. 3 and FIG. 4 the On-line Loan Auction Flowchart 10 is shown in context and integrates the Lender element 11, Bidder Element and the Transaction element 13.

In a second embodiment a method of doing business includes steps of identifying property owners willing to sell their property by an online auction and entering the property owners into contracts. The system may allow an individual property owner connected to a computing system which in turn is connected to a network to input information into the system. This information input by the individual property owner is then stored in a database housed in a central hosting system. The central hosting system may be a website that an individual user may access, authenticate themselves and enter into the site. Information input by the individual property owners will be stored on a database located on a remote host computer. Additionally, the database located on the remote host computer may include information relating to the terms of the contract which may obligate the owners to compete the sale of their respective properties. Moreover, the host computer may also have proprietary software which requires information to be input prior to the auction which may include various information, such as descriptions, pictures relating to the property and a pre-arranged minimum auction price for each property to be sold. Additional information such as attendant costs and fees may be calculated by the processor and proprietary software prior to conducting the on-line auction with a plurality of bidders for each property. At the conclusion of the auction there is a winning bidder. The method further includes the step of ensuring transfer of funds from the winning bidder to the property owner.

The property is a secured promissory note. The method still further includes the steps of arranging for delivery of the secured promissory note to the winning bidder through a licensed escrow holder, placing on an online web site or portal, relevant information about said auction and the secured promissory notes and supporting documents and limiting bidding to only those bidders with proven sufficient resources to successfully consummate the auction.

In a third embodiment a method doing business includes the steps of identifying owners of secured promissory notes willing to sell their secured promissory notes by an online auction and entering the owners into a contract the terms of which obligates them to complete the sales of their respective secured promissory notes. The method also includes the steps of pre-arranging a minimum auction price for the secured promissory note that accounts for the secured promissory note owner's interest and contracted costs and fees, placing on the auction portal relevant information about the secured promissory note and related documents and limiting bidding to bidders who have proven sufficient resources to complete the transaction. The method further includes the steps of conducting an auction for the secured promissory note whereby at the auction's conclusion there is a winning bidder, arranging for the delivery of the original secured promissory note, its security instrument (trust deed or mortgage), the documentation supporting the value of security of the secured promissory note (appraisal), and evidence of ownership (title insurance) to a licensed escrow holder, who at the conclusion of the auction, will deliver evidence of ownership of the original secured promissory note and related documents to the winning bidder and the appropriate proceeds to said note owner and ensuring the transfer of the winning bidder's purchase funds to the escrow holder.

In a fourth embodiment a method of doing business includes the steps of identifying a plurality of owners plurality of properties, each of which would be willing to sell at least one of their respective properties via online auction, entering into contracts with the plurality of owners obligating them to complete the sales of their respective property's conducted pursuant to the contracts' terms and pre-arranging a minimum auction price for their respective properties that accounts for interest of the respective owner's, transaction costs and fees. The method also includes the steps of conducting a plurality of on-line auctions for a plurality of properties with a plurality of bidders for the owners' properties. The property is a secured promissory note. The method may further include the step of arranging for the delivery of evidence of ownership of each secured promissory note to the respective winning bidder. This method may still also includes the steps of placing on the auction portal relevant information about the secured promissory note and related documents, limiting bidding to bidders who have proven resources to complete the transaction and the step of holding and completing the auction for a defaulted secured promissory note immediately preceding the foreclosure, trustee, marshal, judicial or any other court ordered sale of the note's underlying security.

In the fifth embodiment a method of doing business includes identifying an owner of the property willing to sell his property by an online auction, entering into a contract with the owner obligating him to complete the sales of his property conducted pursuant to terms of the contract; pre-arranging a minimum auction price for his property that accounts for the owner's interest, plus costs and fees, conducting the on-line auction with a plurality of bidders for his property whereby at the on-line auction's conclusion, there is a winning bidder and ensuring the transfer of the winning bidder's funds to the escrow holder. A first step is to identify a plurality of owners of a plurality of properties each of which are willing to sell at least one of their respective properties by an online auction and to enter into contracts with the owners obligating them to complete the sales of their property conducted pursuant to terms of the contract. A second step is to pre-arrange a minimum auction price for his property that accounts for interest of the owner, plus costs and fees and to conduct an on-line auction for the property of one of the owners with a plurality of bidders for his property. The third step is to arrange for the delivery of the secured promissory note. The fourth step is to place on the auction's portal, relevant information about the secured promissory note and related documents and to limit bidding to bidders who have proven resources to complete the transaction.

In summary the method includes a first step of the method is identifying a plurality of owners of a plurality of properties each of which are willing to sell at least one of their respective properties by an online auction and entering into a contract with the owners obligating them to complete the sales of their respective properties conducted pursuant to the terms of the contracts and a second step is pre-arranging a minimum auction price for his property that accounts for interest of the owner, plus costs and fees and conducting an on-line auction for the property of one of the owners with a plurality of bidders for his property. The method also includes a third step of the method is arranging for the delivery of the secured promissory note and a fourth steps of the method includes placing an the auction's Portal relevant information about the secured promissory note and related documents and limiting bidding to bidders who have proven resources to complete the transaction.

From the foregoing, it can be seen that a method of doing business has been described. It should be noted that the sketches are not drawn to scale and that distances of and between the figures are not to be considered significant.

Accordingly, it is intended that the foregoing disclosure and showing made in the drawings shall be considered only as an illustration principle of the present invention.

What is claimed is:

1. A method of auctioning a property, the method comprising the steps of:
    identifying, by the processor, property owners remotely connected to a computer network by utilizing a computer station whereby the property owners are willing to sell their property by an online auction;
    providing, by the processor, a database to compile information on properties and property owners;
    the database having at least contractual information, whereby a property owner enters into contracts and the terms of which obligates them to complete sale of their respective properties;
    the database further has relevant information relating to the property, including property information pricing and secured promissory note and related documents;
    limiting, by the processor, bidding to bidders who have proven sufficient resources to complete the transaction;
    conducting an auction for the secured promissory note whereby at the auction's conclusion there is a winning bidder;
    arranging, by the processor, for the delivery of the original secured promissory note, its security instrument (trust deed or mortgage), the documentation supporting the value of security of the secured promissory note (appraisal), and evidence of ownership (title insurance) to a licensed escrow holder, who at the conclusion of said auction will deliver evidence of ownership of the original secured promissory note and related documents to the winning bidder and the appropriate proceeds to said note owner; and
    ensuring, by the processor, the transfer of the winning bidder's purchase funds to the escrow holder.

2. The method of claim 1, further comprising pre-arranging a minimum auction price for at least one of the identified owner's properties.

3. The method of claim 1, further comprising conducting an additional auction for an additional property.

4. The method of claim 1, wherein the auction comprises an on-line auction.

5. The method of claim 1, further comprising identifying an individual seller, providing the database with information on a property of the individual seller, and providing the database with information on the individual seller.

* * * * *